(12) United States Patent
Bouman et al.

(10) Patent No.: US 11,423,309 B2
(45) Date of Patent: Aug. 23, 2022

(54) SYSTEM AND METHOD FOR LATENCY REDUCTION IN AN OPTICAL IMAGING SYSTEM

(71) Applicants: Purdue Research Foundation, West Lafayette, IN (US); HIGH PERFORMANCE IMAGING LLC, West Lafayette, IN (US)

(72) Inventors: Charles Addison Bouman, West Lafayette, IN (US); Sherman Jordan Kisner, Niskayuna, NY (US)

(73) Assignee: Purdue Research Foundation, West Lafayette, IN (US)

( * ) Notice: Subject to any disclaimer, the term of this patent is extended or adjusted under 35 U.S.C. 154(b) by 24 days.

(21) Appl. No.: 17/153,659

(22) Filed: Jan. 20, 2021

(65) Prior Publication Data
US 2021/0295152 A1    Sep. 23, 2021

Related U.S. Application Data

(60) Provisional application No. 62/992,614, filed on Mar. 20, 2020.

(51) Int. Cl.
*G06N 3/08* (2006.01)
*G06T 7/00* (2017.01)
(Continued)

(52) U.S. Cl.
CPC ............. *G06N 3/08* (2013.01); *G03H 1/0443* (2013.01); *G06N 3/04* (2013.01); *G06T 7/0002* (2013.01);
(Continued)

(58) Field of Classification Search
CPC .......... G06N 3/08; G06N 3/04; G03H 1/0443; G03H 2001/0445; G06T 7/0002;
(Continued)

(56) References Cited

U.S. PATENT DOCUMENTS

2010/0033691 A1\* 2/2010 Hung .................... H04N 9/3129
353/70
2020/0117139 A1\* 4/2020 Supikov ................ G06T 19/006

OTHER PUBLICATIONS

Babcock, H. W., "The Possibility of Compensating Astronomical Seeing," Publications of the Astronomical Socieity of the Pacific, Oct. 1953, vol. 65, No. 386, 229-236 (8 pages).
(Continued)

*Primary Examiner* — Allen C Wong
(74) *Attorney, Agent, or Firm* — Maginot, Moore & Beck LLP

(57) ABSTRACT

A computer-implemented method of latency reduction is disclosed for a digital holography optical imaging system. The method comprises receiving an incoming light field at a focal plane array of the digital holography optical imaging system, applying an interfering light field to the incoming light field at the focal plane array, and generating a holographic image based on the incoming light field and the interfering light field at the focal plane array. The method further comprises generating a sequence of phase errors based on the holographic image, generating at least one training parameter based on the sequence of phase errors, and training a neural network to revise the at least one training parameter using the sequence of phase errors, a time delay, and the at least one training parameter. The method further comprises predicting a future phase error for a future holographic image based on the revised training parameter.

20 Claims, 12 Drawing Sheets

(51) Int. Cl.
  *G03H 1/04* (2006.01)
  *G06N 3/04* (2006.01)
(52) U.S. Cl.
  CPC ............... *G03H 2001/0445* (2013.01); *G06T 2207/20081* (2013.01); *G06T 2207/20084* (2013.01); *G06T 2207/30168* (2013.01)
(58) Field of Classification Search
  CPC . G06T 2207/20081; G06T 2207/20084; G06T 2207/30168
  USPC .......................................................... 348/80
  See application file for complete search history.

(56) References Cited

OTHER PUBLICATIONS

Poon, T.-C. et al., "Introduction to Modern Digital Holography with MATLAB," Cambridge University Press, 2014 (228 pages).
Winzer, P. J. et al., "Coherent lidar at low signal powers: basic considerations on optical heterodyning," Journal of Modern Optics, 1998, vol. 45, No. 8, 1549-1555 (7 pages).
Spencer, M. F. et al., "Deep-turbulence wavefront sensing using digital-holographic detection in the off-axis image plane recording geometry," Optical Engineering, Mar. 2017, vol. 56, No. 3, 031213 (13 pages).
Thornton, D. E. et al., "Deep-turbulence wavefront sensing using digital holography in the on-axis phase shifting recording geometry with comparisons to the self-referencing interferometer," Applied Optics, Feb. 2019, vol. 58, No. 5, A179-A189 (11 pages).
Marron, J. C. et al., "Holographic laser radar," Optics Letters, Mar. 1993, vol. 18, No. 5, 385-387 (3 pages).
Thurman, S. T., "Phase-error correction in digital holography using single-shot data," Journal of the Optical Society of America A, Dec. 2019, vol. 36, No. 12, D47-D61 (15 pages).
Thurman, S. T. et al., "Correction of anisoplanatic phase errors in digital holography," Journal of the Optical Society of America A, Apr. 2008, vol. 25, No. 4, 995-999 (5 pages).
Marron, J. et al., "Extended-range digital holographic imaging," Proc SPIE 7684, Laser Radar Technology and Applications XV, Apr. 2010, vol. 7684, 76841J (7 pages).
Tippie, A. E. et al., "Phase-error correction for multiple planes using a sharpness metric," Optics Letters, Mar. 2009, vol. 34, No. 5, 701-703 (3 pages).
Tippie, A. E. et al., "Multiple-plane anisoplanatic phase correction in a laboratory digital holography experiment," Optics Letters, Oct. 2010, vol. 35, No. 19, 3291-3293 (3 pages).
Tippie, A. E., "Aberration Correction in Digital Holography," UMI Dissertation Publishing, ProQuest LLC, 2012 (190 pages).
Thurman, S. T. et al., "Phase-error correction in digital holography," Journal of the Optical Society of America A, Apr. 2008, vol. 25, No. 4, 983-994 (12 pages).
Greenwood, D. P., "Bandwidth specification for adaptive optics systems," Journal of the Optical Society of American, Mar. 1977, vol. 67, No. 3, 390-393 (4 pages).
Schöck, M. et al., "Method for a quantitative investigation of the frozen flow hypothesis," Journal of the Optical Society of America A, Sep. 2000, vol. 17, No. 9, 1650-1658 (9 pages).
Widrow, B. et al., "Stationary and Nonstationary Learning Characteristics of the LMS Adaptive Filter," Proceedings of the IEEE, Aug. 1976, vol. 64, No. 8, 1151-1162 (12 pages).
Sulaiman, S. et al.,"Predictive dynamic digital holography and image sharpening," Journal of the Optical Society of America A, Jun. 2018, vol. 35, No. 6, 923-935 (13 pages).
Spencer, M. et al., "Digital holography wave-front sensing in the presence of strong atmospheric turbulence and thermal blooming," Proceedings of SPIE, 2015, vol. 9617, 961705 (17 pages).
Banet, M. et al., "Digital holography wavefront sensing in the pupil-plane recording geometry for distributed-volume atmospheric aberrations," Proceedings of SPIE, Sep. 2016, vol. 9982, 998208 (18 pages).
Pellizzari, C. J. et al., "Phase-error estimation and image reconstruction from digital-holography data using a Bayesian framework," Journal of the Optical Society of America A, Sep. 2017, vol. 34, No. 9, 1659-1669 (11 pages).
Pellizzari, C. J. et al., "Demonstration of single-shot digital holography using a Bayesian framework," Journal of the Optical Society of America A, Jan. 2018, vol. 35, No. 1, 103-107 (5 pages).
Pellizzari, C. J. et al., "Imaging through distributed-vol. aberrations using single-shot digital holography," Journal of the Optical Society of America A, Feb. 2019, vol. 36, No. 2, A20-A33 (14 pages).
Pellizzari, C. et al., "Inverse synthetic aperture LADAR image construction: an inverse model-based approach," Proceedings of SPIE, Sep. 2016, vol. 9982, 99820F (7 pages).
Pellizzari, C. J. et al., "Synthetic Aperature LADAR: A Model-Based Approach," IEEE Transactions on Computational Imaging, Dec. 2017, vol. 3, No. 4, 901-916 (16 pages).
Baum, L. E. et al., "Statistical Inference for Probabilistic Functions of Finite State Markov Chains," The Annals of Mathematical Statistics, Dec. 1966, vol. 37, No. 6, 1554-1563 (11 pages).
Venkatakrishnan, S. V. et al., "Plug-and-Play Priors for Model Based Reconstruction," IEEE Global Conference on Signal and Information Processing (GlobalSIP), 2013, 945-948 (4 pages).
Sreehari, S. et al., "Plug-and-Play Priors for Bright Field Electron Tomography and Sparse Interpolation," IEEE Transactions on Computational Imaging, Dec. 2016, vol. 2, No. 4, 408-423 (16 pages).
Buzzard, G. T. et al., "Plug-and-Play Unplugged: Optimization-Free Reconstruction Using Consensus Equilibrium," Society for Industrial and Applied Mathematics (SIAM), 2018, vol. 11, No. 3, 2001-2020 (20 pages).
Pellizzari, C. J. et al., "Optically coherent image formation and denoising using a plug and play inversion framework," Applied Optics, Jun. 2017, vol. 56, No. 16, 4735-4744 (10 pages).
Pellizzari, C. et al., "Optically coherent image reconstruction in the presence of phase errors using advanced-prior models," Proceedings of SPIE, May 2018, vol. 10650, 106500B (15 pages).
Srinath, S. et al., "Computationally efficient autoregressive method for generating phase screens with frozen flow and turbulence in optical simulations," Optics Express, Dec. 2015, vol. 23, No. 26, #251134, 33335-33349 (15 pages).
Marron, J. C. et al., "Atmospheric turbulence correction using digital holographic detection: experimental results," Optical Express, vol. 17, No. 14, p. 11638-11651, Jul. 2009 (14 pages).
Bottou, L, Large-Scale Machine Learning with Stochastic Gradient Descent, Proceedings of COMPSTAT'2010, 2010, pp. 177-186 (10 pages).
Tyson, R. et al. "Field Guide to Adaptive Optics," Second Edition, vol. FG24, SPIE Press Book, 2012.

* cited by examiner

Repeat until converged
{

For all pixels $s$,    $s \leftarrow \dfrac{\sigma_w^2}{\alpha + \dfrac{\sigma_w^2}{r_s'}}$            (1.1)

$\leftarrow \Box \left( \dfrac{1}{\alpha + \dfrac{\sigma_w^2}{r_s'}} \right)^H (\ ^{-j\phi'})\ _a \Box$        E-step with FFTs    (1.2)

$\leftarrow \dfrac{\phantom{a}}{\sigma_w^2}\ a$            (1.3)

For all $s$
    {    *Phase Update*

$s \leftarrow s\ _s^*, \quad s \leftarrow \{\ _s\}$ and $_t \leftarrow |\ _s|$     (1.4)

$_s' \leftarrow \phi_s \boxdot\ _s \cos(\ _s -\ _s) +\ _3(\ _s,\ \acute{r}*s)\}$   (1.5)
    }

For all $s$
    {    *Reflectance Update*

$_s' \leftarrow r_s \{\dfrac{|\ _s + |\mu_s|^2}{r_s} + \log\ _s +\ _4(\ _s,\ \acute{r}*s)\}$   (1.6)
    }
}

FIG. 7

SYSTEM AND METHOD FOR LATENCY REDUCTION IN AN OPTICAL IMAGING SYSTEM

CROSS-REFERENCE TO RELATED APPLICATIONS

This document claims priority to U.S. Provisional Patent Application Ser. No. 62/992,614, tiled Mar. 20, 2020, the entire contents of which are incorporated herein by reference.

GOVERNMENT LICENSE RIGHTS

This invention was made with. Government support under Contract FA9451-18-P-0250 awarded by the United States Air Force. The Government has certain rights in the invention.

FIELD

The present disclosure relates to digital image processing, and particularly to systems and methods for reducing latency in the correction of optical/electromagnetic wavefronts in optical imaging arrangements.

BACKGROUND

It has long been known that the atmosphere can introduce phase errors induced by turbulence or temperature gradients that distort transmitted light. The methods of adaptive optics (AO) have been used to address this problem of atmospheric phase distortion in a wide array of imaging applications including imaging with astronomical telescopes. Phase distortions generally result in blurring and aberration in a wide variety of imaging applications including for example: a) images formed by convention optical lenses that are blurred due to atmospheric turbulence; b) images form by computational imaging techniques such as holographic imaging that are blurred and distorted due to atmospheric turbulence; c) applications that attempt to focus emitted optical or electromagnetic energy on a distant object in which the wave-front is blurred or distorted due to atmospheric turbulence.

Over the past decade, there have been algorithms developed which allow the phase distortions to be estimated from digital holographic (DH) optical data. These methods require that multiple "shots" or independent looks of the data be obtained so that the results could be averaged to account for statistical variations known as speckle. More recently, algorithms known as digital holographic model-based iterative reconstruction (DH-MBIR) have been developed that allow the phase distortions to be estimated from a single "shot" or measurement of DH data.

Some important applications require that the latency of phase error estimates be very low. These applications typically utilize phase error estimates in order to make corrections in "real time." For example, when focusing an emitted optical energy source, the phase corrections must be made before the atmospheric conditions change. In practice, the atmosphere can change in approximately 1 msec (1/1000 see), so in order to assure that the corrections are "fresh", the phase error corrections must be computed with a delay of less than 100 μsec (1/10,000 sec) from when the measurement is made. In this case, the constraint on maximum latency (i.e., the time between when the measurement is first made and when the phase error estimates are available) is therefore a crucial constraint for a functional system. Since multi-shot DH methods require that multiple looks be taken, it is difficult or impossible to compute phase error estimates using multi-shot DH methods within the required latency constraints.

DH-MBIR algorithms can substantially lower latency estimation of phase errors because they only require a single shot of data, However, even with single-shot methods such as DH-MBIR, meeting the throughput and latency requirements is still very challenging. For example, DH-MBIR may require that 10,000 phase error estimates be processed every second. This implies a throughput of 10,000 Hz. While this is challenging, throughput can always be increased by using more processors to compute the phase estimates in parallel. However, while this parallelization increases throughput, it does not reduce computation latency. Therefore, reducing the latency to less than 100 μsec is the more fundamental computational challenge for effective phase error estimation.

As noted above, a limitation of DH-MBIR (or any existing wave-front sensing algorithm) is that latency in the computation of the phase field, $\phi$. This latency implies that the output will always be somewhat "stale" or delayed relative to the ideal values. DH-MBIR and other methods for estimating wave-front phase error are iterative in nature and require an initial condition. A better initial condition reduces the number of iterations required for accurate computation of the phase error estimate. Consequently, the latency in phase error estimation reduces the quality of this initialization, which subsequently increases the required number of iterations, which subsequently increases the latency. This results in a vicious cycle of increasing errors and less accurate phase error estimates. The situation is illustrated in FIG. 1 where a DH-MBIR system 100 includes a DH-MBIR algorithm 110 that receives an input 120 ($y_n$) and an initial condition 130, and provides an output 140. The output 130 is fed back to the algorithm 110 as the initial condition. In each case, the output 140 is delayed by a latency, D, relative to the current time. Here D is discrete, so at a sampling rate of 10 kHz and a latency of 1 msec, D=10.

The stale phase estimates resulting from latency have two undesirable implications. First, the stale estimates provide a poor initial condition to the DH-MBIR algorithm, which in turn requires more iterations, creating greater latency. Second, for the application of wave-front control, these phase estimates are required to control the phase of an outgoing optical source.

It is believed that in order to more successfully implement real-time phase error sensing for applications such as wave-front correction when focusing an emitted optical beam, it would be advantageous to do all computations with latency approximately less than $1/(100*f_g)$ where $f_g$ is the Greenwood frequency. Experiments indicate that a typical Greenwood frequency for a turbulent imaging scenario may range from 50 Hz to 200 Hz with 100 Hz being a typical value. This results in a requirement that total latency from measurement to application of the phase correction be limited to less than 100 μsec, which is difficult to achieve in practical systems do the delays in computation, sensing, and application of phase error corrections.

A stale field of phase error corrections caused by latency will introduce errors that can substantially corrupt an outgoing beam. For example, at a Greenwood frequency of 100 Hz and a latency of 1 msec, the phase field will shift by 10% of its size assuming a frozen flow model. This means that for a 100×100 phase field array, the latency of 1 msec will shift the phase error estimates by approximately 10 pixels relative to their optimal values. This 10-pixel shift will substantially degrade the quality of phase error correction.

In view of the foregoing, the challenge in many applications that require atmospheric phase correction is that the phase correction estimates must be available with very low latency. While recently developed single-shot DH-MBIR methods make low-latency estimates possible, achieving extremely low latencies much less than 100 μsec is difficult due to computation delays. Therefore, it would be desirable to provide systems and methods that can both a) reduce latency of phase error estimates, and b) compensate for any remaining latency in phase error estimates.

SUMMARY

A system and method is disclosed herein for reduction or elimination of latency in the implementation of algorithms for the estimation of wave-front phase error. Estimation of phase error for incoming or outgoing electromagnetic wavefronts is critical for the formation of sharp images using digital-holographic techniques, and it is also critical for the formation of focused beams of outgoing electromagnetic energy. Latency in the wave-front phase error is caused by delays in computation, measurement, and implementation of the phase error corrections. Phase error estimation or correction latency can substantially degrade the quality of image or beam formation, so it is unacceptable in many applications. The method and system disclosed herein minimizes or eliminates this latency by predicting future phase errors from the past sequence of phase errors using machine learning within an artificial neural network (i.e., "neural network").

In at least one embodiment, a computer-implemented method of latency reduction is provided for a digital holography optical imaging system. The method comprises receiving an incoming light field at a focal plane array of the digital holography optical imaging system, applying an interfering light field to the incoming light field at the focal plane array, and generating a holographic image based on the incoming light field and the interfering light field at the focal plane array. The method further comprises generating a sequence of phase errors based on the holographic image, generating at least one training parameter based on the sequence of phase errors, and training a neural network to revise the at least one training parameter using the sequence of phase errors, a time delay, and the at least one training parameter. The method further comprises predicting a future phase error for a future holographic image based on the revised training parameter.

In at least one embodiment, a computer-implemented method is disclosed for latency reduction in a digital holography optical imaging system, including two adaptive predictors. The method comprises receiving an incoming light field, and then generating a reconstructed image and estimated phase error based on the received incoming light field. The reconstructed image and estimated phase error are generated by a digital holographic model-based iterative reconstruction (DH-MBIR) method defined by an initial condition. The reconstructed image and estimated phase error are defined by a computation latency of the DH-MBIR method. The method further comprises applying the reconstructed image and estimated phase error generated by the DH-MBIR method to a first adaptive predictor, and generating, with the first adaptive predictor, a revised initial condition for the DH-MBIR method. Additionally, the method comprises applying the reconstructed image and estimated phase error generated by the DH-MBIR method to a second adaptive predictor, and generating, with the second adaptive predictor, a predicted future image and predicted future phase error associated with a future time.

In at least one embodiment, an optical imaging system includes a laser configured to emit light, a focal plane array, and an interfering light source. The focal plane array is configured to receive an incoming light field including reflected light from the laser, the reflected light being reflected from an object distant from the focal plane array. The interfering light source is configured to apply an interfering light field to the focal plane array. The optical imaging system further includes at least one processor configured to generate an image based on the incoming light field and the interfering light field at the focal plane array. The at least one processor is further configured to generate a sequence of phase errors based on the image, generate at least one training parameter based on the sequence of phase errors, and train a neural network to provide at least one revised training parameter using the sequence of phase errors, a time delay, and the at least one training parameter. Additionally, the at least one processor is configured to predict a future phase error for a future image based on the revised training parameter.

The above described features and advantages, as well as others, will become more readily apparent to those of ordinary skill in the art by reference to the following detailed description and accompanying drawings. While it would be desirable to provide a method and system for latency reduction in a digital holography optical imaging system that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

BRIEF DESCRIPTION OF THE DRAWINGS

FIG. 7 shows a pseudocode for EM solution to DH-MBIR.

DESCRIPTION

A system and method for Adaptive Temporal Phase Prediction (ATPP) is disclosed herein. The system and method predicts future phase estimates based on previous temporal phase statistics. The ATPP algorithm takes the time sequence of previous phase error estimates as input, and it outputs an estimate of the future phase errors. These phase error predictions can be used to both (i) compensate for the latency in the computed phase errors, and (ii) reduce the latency of computation of the DH-MBIR algorithm through improved state initialization. Therefore, the ATPP algorithm can be used to reduce or eliminate the latency of phase error estimates for the DH-MBIR algorithm and other phase estimation algorithms. By reducing or eliminating phase error latency, the ATPP method and system makes closed loop or real-time phase error correction possible for important applications such as the focusing of emitted optical energy or the real-time imaging of distant objects.

ATPP

The ATPP method and system are first described herein with reference to FIGS. 2-11. It will be recognized that in various embodiments, the ATPP method is used in association with an optical imaging system. For example, the ATPP method may be implemented in association with a digital holography (DH) optical imaging system including at least one light source, a focal plane array, and one or more computer processors. Examples of such a DH optical imaging systems are described later the specification with reference to FIGS. 4 and 12A-13B.

Figure 1:
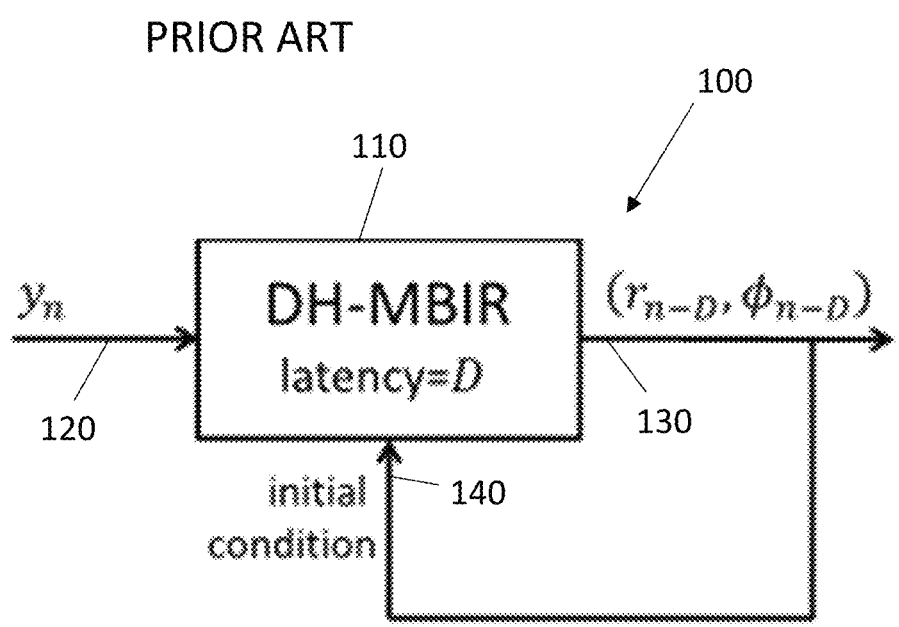
FIG. 1 shows a block diagram illustrating implementation of a conventional DH-MBIR phase error estimation algorithm resulting in a potentially large latency and less than optimal initial condition.
Figure 2:
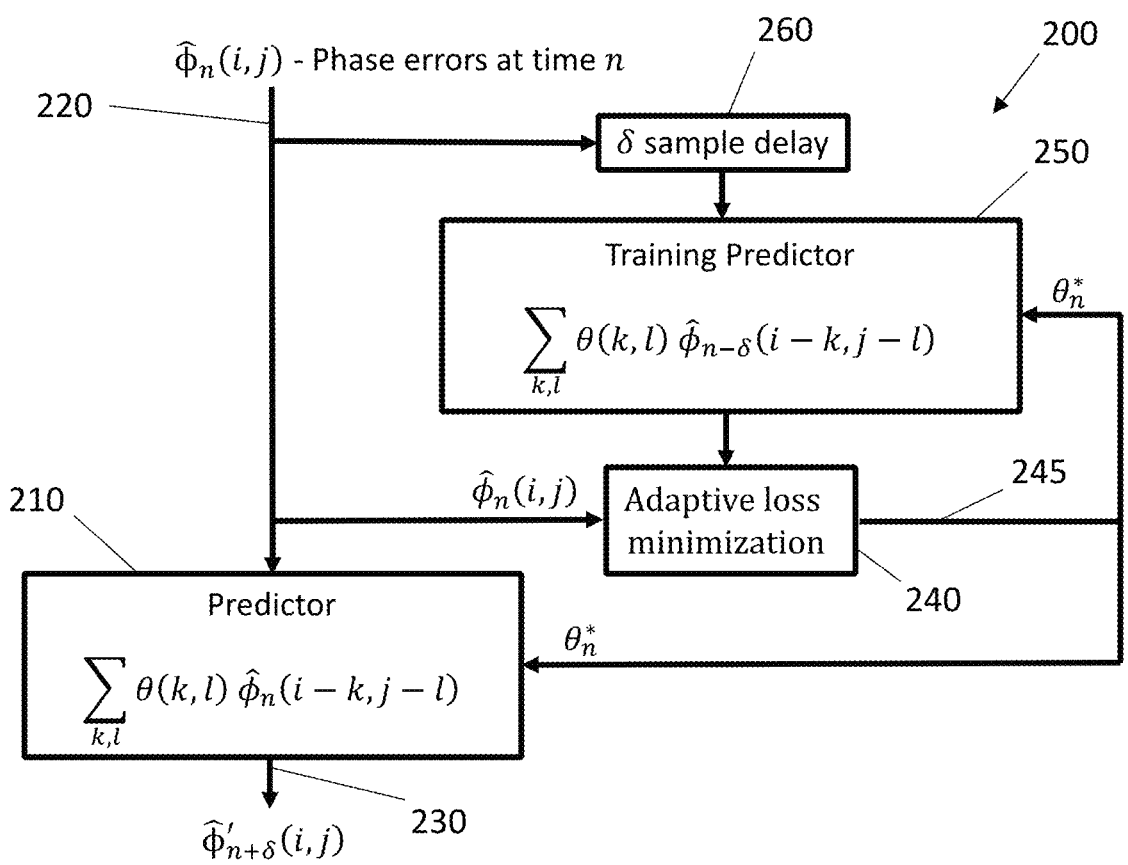
FIG. 2 shows a flowchart of a method of adaptive temporal phase prediction.

With particular reference now to FIG. 2, a flow diagram of one embodiment of an ATPP system 200 incorporating the basic ATPP algorithm/function is shown, as noted at block 210. The purpose of the ATPP algorithm is to predict the 2D field of phase errors at the future time of n+δ from a past sequence of phase errors. The input 220 to the predictor is a sequence of phase error estimates $\hat{\phi}_n(i, j)$ where n denotes time and (i, j) denote the phase error estimate at column i and row j of the 2D array of phase errors estimates. These phase error estimates, $\hat{\phi}_n(i, j)$, can be generated by the DH-MBIR algorithm or some other algorithm for phase error correction. Then the ATPP function estimates the phase error at some time interval δ in the future to produce $\hat{\phi}'_{n+\delta}(i, j)$. Mathematically, the ATPP function can be represented as $$\hat{\phi}'_{n+\delta} = ATPP_\theta(\hat{\phi}_n; \delta) \quad (1)$$

where δ is the amount of time-advance that is desired, and θ is a training parameter learned within a neural network by training from previous samples of the phase error sequence.

One embodiment of the ATPP predictor is as a linear predictive filter. This embodiment is shown at block 210 of the flow diagram of FIG. 2. In this case, the predicted phase error can be computed as $$\hat{\phi}'_{n+\delta}(i, j) = \sum_{k,l} \theta(k, l)\hat{\phi}_n(i-k, j-l) \quad (2)$$

where θ(k, l) is the impulse response of the predictor, For example, if $\theta(k, l)=\delta(m-m_0, n-n_0)$, then the prediction output 230 has the form $$\hat{\phi}'_{n+\delta}(i, j) = \hat{\phi}_n(i-m_o, j-n_o) \quad (3)$$

and the predicted set of phase errors is a shifted version of the input 220. This type of prediction is the basis of a relatively accurate model used for atmospheric phase distortion that is referred to as the Taylor frozen flow hypothesis.

In order for the ATPP predictor system 200 to work properly, it is supplied with a training parameter in the form of the parameter vector θ. This training parameter can be learned by minimizing a loss function in a neural network. The loss function is provided by a loss function module which is included in the adaptive loss minimization (see block 240 of FIG. 2 and the parameter vector θ provided at output 245). A typical loss function based on squared error (SE) has the form $$\text{loss}(n, \theta) = \sum_{i=0}^{n} \left\| \hat{\phi}_n - ATPP_\theta(\hat{\phi}_{n-\delta}; \delta) \right\|^2. \quad (4)$$

In other embodiments, different loss functions other than one based on SE can be used, or the training parameter θ can be estimated using approximate minimization methods such as stochastic gradient descent or least-squares adaptive methods. In addition, the loss function can be minimized in a way that constrains the impulse response θ to be sparse or have other desirable properties.

FIG. 2 shows how the training parameter vector θ is estimated from the sequence of previous phase errors using a training predictor, as noted at block 250. To do this, the input sequence of phase error estimates is first delayed by δ time-steps, as noted at block 260, and then the training predictor 250 is applied to estimate the predicted phase error estimates $\hat{\phi}_n(i, j)$. Notice that the training predictor 250 uses the same parameter vector, $\theta^*_n$, as is used in the actual predictor. Since the input to the training predictor 250 is delayed by δ time-steps, the true phase error estimates that it is predicting $\hat{\phi}_n(i, j)$, are known. These true phase error estimates are known as "ground truth" because they are known to be the correct result for the predictor, and they can be used for minimizing the loss function or training in some other fashion. Notice that the output of the training predictor 250 is not useful since the true phase errors, $\hat{\phi}_n(i, j)$, are known. However, the training parameters that are estimated from the training predictor, and particularly $\theta^*_n$, are valuable because they can also be used in the true ATPP predictor 210.

The value of $\theta^*_n$ is typically chosen to minimize the loss, and this adapted parameter vector is sent to both predictors for use in the next time step. For example, one method for computing $\theta^*_n$ is shown below.

$$\theta^*_n = \underset{\theta}{\mathrm{argmin}}\, \mathrm{loss}\,(n, \theta) \qquad (5)$$

Next, the ATPP method is described using equations for the more general case when both the phase error estimates and the reconstructed images are predicted. Phase error prediction algorithms, such as DH-MBIR, typically estimate a reconstructed image along with the phase error estimates. In some applications, the reconstructed image is of importance such as in intelligence, surveillance, and reconnaissance (ISR) applications in which it is valuable to form an image of an object at a distance through atmospheric turbulence. However, in other applications the reconstructed image must be reconstructed as part of the phase error estimation process.

If the image estimate at time n is denoted as $\hat{r}_n$, then the ATPP method can be extended to include prediction of the pair $(\hat{r}_n, \hat{\phi}_n)$. In this case, the ATPP predictor has the form $$(\hat{r}'_{n+\delta}, \hat{\phi}'_{n+\delta}) = ATPP_\theta(\hat{r}_n, \hat{r}_{n-1}, \ldots, \hat{r}_{n-p-1}, \hat{\phi}_n, \hat{\phi}_{n-1}, \ldots, \hat{\phi}_{n-p-1}; \delta) \qquad (6)$$

where $(\hat{r}'_{n+\delta}, \hat{\phi}'_{n+\delta})$ is a prediction of the future image and phase error and $\hat{r}_n, \hat{r}_{n-1}, \ldots, \hat{r}_{n-p-1}$ are the p previous reconstructed images. In this case, using p>1 can be useful since it allows the ATPP algorithm to better predict the values of $(\hat{r}'_{n+\delta}, \hat{\phi}'_{n+\delta})$.

In view of the foregoing, it will be recognized that FIG. 2 illustrates an exemplary embodiment the ATTP methodology, which may be implemented by a computer in a digital holography optical imaging system (e.g., as shown and described in association with FIG. 4, below) in order to provide a method of latency reduction. The method comprises receiving an incoming light field at a focal plane array of the digital holography optical imaging system, applying an interfering light field to the incoming light field at the focal plane array, and generating a holographic image based on the incoming light field and the interfering light field at the focal plane array. As particularly shown in FIG. 2, the method further comprises generating a sequence of phase errors ($\hat{\phi}_n(i, j)$; see input 220) based on the holographic image. The method also comprises generating at least one training parameter ($\theta^*_n$) based on the sequence of phase errors ($\hat{\phi}_n(i,j)$), and training a neural network (see block 250) to revise the at least one training parameter using the sequence of phase errors ($\hat{\phi}_n(i, j)$), a time delay (δ), and the at least one training parameter ($\theta^*_n$). The method further comprises predicting a future phase error ($\hat{\phi}'_{n+\delta}(i, j)$; see output 230) for a future holographic image based on the revised training parameter ($\theta^*_n$).

Figure 3:
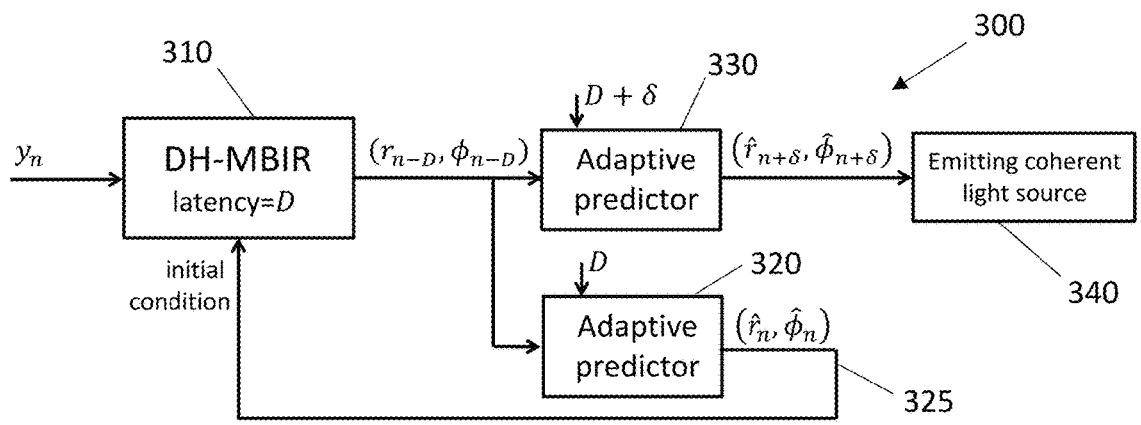
FIG. 3 shows a block diagram of an implementation of a DH-MBIR algorithm, using adaptive temporal phase prediction (ATPP) to predict the future phase field from the past.

FIG. 3 illustrates the ATPP method 300 for adaptively correcting the phase field estimates using two ATPP predictors. This approach differs from other approaches (e.g., a Kalman based prediction approach) since it predicts future values of that phase error in order to correct the latency. In this embodiment, an incoming light field, $y_n$, is subjected to a DH-MBIR algorithm, as noted at block 310, to generate a reconstructed image and estimated phase error. Two adaptive predictors are used to correct the phase field estimates, as noted by blocks 320 and 330 of FIG. 3. The first predictor, as noted at block 320, is designed to produce a prediction 325 that is optimized for use as an initial condition to the DH-MBIR algorithm, as noted at block 310. The second predictor, as noted at block 330, is designed to compensate for latency in wave-front estimation applications. Notice that this allows for the possibility that the estimated wavefront is computed for time n+δ, where δ is a parameter that can be adjusted to optimize overall system performance. For example, in FIG. 3, it is shown that the phase field estimates enter into a subsequent system labelled "emitting coherent light source," as noted at block 340. In this example, the emitting source might include its own latency delays; so, the value of δ could be used to adjust for those non-idealities. It will also be noted that the ATPP predictor can be designed so that δ can be a continuous parameter, in the present case, allowing for fractional times shifts less than 100 μsec. Thus, it will be recognized that the implementation of the ATPP method as shown in FIG. 3 has two important effects: (1) first, it provides a better initial condition, and (2) second, it allows for adjustment of output phase timing.

In one embodiment of the ATPP system, a linear predictor such as the Least Mean Squared (LMS) adaptive filter, is used to perform the prediction. In this embodiment, let $\phi_i^{(k)} \in \mathfrak{R}^n$ denote the fully reconstructed phase-screen frame at pixel i at the k-th time step, where k=1, . . . , N. Let $z_i^{(k)} \in \mathfrak{R}^m$ denote the m-point neighborhood for pixel i at the k-th time step, where the neighborhood includes the pixel i itself, and let $h \in \mathfrak{R}^m$ denote the predictive-filter weights. A desired goal is then to choose the prediction filter, h, that minimizes the following MSE objective function:

$$f(h) = \sum_{k=1}^{N-1} \frac{1}{2} \| \phi^{(k+1)} - z^{(k)T} h \|^2 \qquad (7)$$

In at least one embodiment, Stochastic Gradient descent (SOD) may be used to minimize the above objective function. So, the weights h are adapted from frame to frame according to the following update rule, For k=1 to N, $$h \leftarrow h + \frac{\alpha}{P} \sum_{i=1}^{P} z_i^{(k)} (\phi_i^{(k+1)} - h^t z_i^{(k)}), \qquad (8)$$

where $\alpha>0$ is a suitably chosen learning rate and P is the number of pixels used in the image for adaptation. Then the prediction for the $i^{th}$ pixel is implemented as an inference operation according to the following operation:

$$\hat{\phi}_i^{(k+1)} \leftarrow h^t z_i^{(k)} \qquad (9)$$

In view of the foregoing, it will be recognized that FIG. 3 illustrates an exemplary embodiment the ATTP methodology, which may be implemented by a computer in a digital holography optical imaging system in order to provide a method of latency reduction. As explained above, the method comprises receiving an incoming light field, $y_n$, and then generating a reconstructed image and estimated phase error based on the received incoming light field. The reconstructed image and estimated phase error are generated by a digital holographic model-based iterative reconstruction (DH-MBIR) method 310 defined by an initial condition 325. The reconstructed image and estimated phase error are defined by a computation latency of the DH-MBIR method. The method further comprises applying the reconstructed image and estimated phase error generated by the DH-MBIR method to a first adaptive predictor 320, and generating with the first adaptive predictor 320, a revised initial condition for the DH-MBIR method (see block 310). Additionally, the method comprises applying the reconstructed image and estimated phase error generated by the DH-MBIR method to a second adaptive predictor, as noted at block 330. The second adaptive predictor 330 then generates a predicted future image and predicted future phase error associated with a future time, as noted at block 340.

Advantages Over Other Latency Reduction Applications

As discussed above, it was previously believed that in order to successfully implement real-time phase error sensing for applications such as wave-front correction when focusing an emitted optical beam, it was necessary to do all computations with latency approximately less than $1/(100*f_g)$ where $f_g$ is the Greenwood frequency. Experiments indicate that a typical Greenwood frequency for a turbulent imaging scenario may range from 50 Hz to 200 Hz with 100 Hz being a typical value. This results in a requirement that total latency from measurement to application of the phase correction be limited to less than 100 μsec, which is difficult to achieve in practical systems.

The ATPP approach is advantageous at least in part because it adaptively predicts future phase errors and images using machine learning methods that have been trained from previous time sequences of phase error and image estimates. This approach advantageously allows for the design of systems with phase error estimate methods that have latencies greater than what is allowed by the Greenwood frequency. In addition, the ATPP algorithm can be used to reduce latency by providing a better initial condition to the DH-MBIR algorithm.

The ATPP method and system disclosed herein has a further advantage in that it can adjust the phase error estimates so that they are time-aligned with the time they are used. If the phase errors are not time-aligned, then the phase error estimates will be wrong, and this will degrade the quality of the phase correction. Poor quality phase corrections will in tuna reduce the quality of the image that is formed or defocus any emitted optical wave-front.

Once the ATPP predictor is trained, the algorithm can be used for a number of important purposes, including (1) latency compensation and (2) latency reduction through better state prediction.

Latency Compensation—The ATPP predictor can be used to predict future states of the image and phase error at time $\delta$ in the future, where $\delta$ represents the overall latency of the algorithm. By adjusting $\delta$ it is then possible to tune the apparent latency so that the phase error estimates are available for the precise time they are required in real-time applications such as wave-front correction when focusing an emitted optical beam. This is analogous to adjusting the timing of audio and video in a manner that synchronizes speech with lip motion in a movie.

Latency Reduction through better state prediction—The ATPP predictor can be used to predict future states of the image and phase error at time $\delta=D$ in the future, where D represents the computation latency of one iteration of the DH-MBIR algorithm, This predicted image and phase error state $(\hat{r}'_{n+D}, \hat{\phi}'_{n+D})$ can then be used to initialize the DH-MBIR algorithm or any other iterative wave-front sensing algorithm, thereby speeding algorithmic convergence and reducing latency.

ATPP achieves the foregoing benefits in two distinct ways. First, it reduces or eliminates misalignment of the phase error estimates. Second, it reduces latency in the DH-MBIR computation, as described below.

Existing practical algorithms for estimating wave-front phase errors always have undesirable latency due to both measurement and computation delays. The ATPP predictor is used to compensate for this latency so that the phase error correction values are time aligned with the phase error corrections. Previously, it was not possible to eliminate this latency, and ATPP addresses this by providing a method for enabling real-time wave-front phase correction when the available phase error estimates have significant latency.

The ATPP predictor can be used to provide a more accurate initial condition to the DH-MBIR algorithm, so that the computation and therefore latency is reduced when computing the phase error estimates. This reduced latency also reduces prediction error in the ATPP predictor, so that the final phase error estimates are more accurate.

Exemplary Commercial Applications

Wave-front sensing (WFS) technology has extensive application in the fields of astronomy, defense and security and is expected to be a growing market through the next several years. The single-shot digital holography based ISR and wave-front sensing (WFS) technologies enabled by ATPP have a wide range of possible uses for the military. First, it can be used to create ISR systems for the any of the four military branches (Air Force, Army, Coast Guard, Marine Corps, and Navy) that can image through isoplanatic atmospheric turbulence. It can also serve as the bases for an ISR system that could image through anisoplanatic atmospheric turbulence. These scenarios can occur when imaging terrestrial scenes at long distances. It can also be used for AO imaging of objects in space that are illuminated with coherent light. Wave-front sensing can also be used to determine the corrections in the phase wave-front required to control an outgoing optical beam. This has a wide array of applications for the military. The same algorithms can be used for real-time imaging of targets from laser radar using doppler/range processing. This could be used for terrestrial imaging of objects or for imaging of satellites either in low earth orbit (LEO) or geosynchronous equatorial orbit (GEO) using synthetic aperture LIDAR (SAL).

Additional Description of DH-MBIR Algorithm and Use in an ATPP System

As discussed previously, a problem of crucial importance in a variety of applications is imaging through atmospheric turbulence. This problem is particularly difficult when imaging must be performed through a distributed volume of fluid that distorts the wave-front phase. In the case of isoplanatic atmospheric distortion, it is typically assumed that the phase distortion occurs near the imaging sensor. This case occurs in applications such as astronomy in which the phase distortion caused by the atmosphere occurs near the ground, In the more difficult case of anisoplanatic distortion, the phase distortion must be modeled by multiple layers as light propagates through the atmosphere from the object being imaged to the imaging sensor.

A promising approach to correction of both isoplanatic and anisoplanatic distortion is the use of digital holographic (DH) imaging techniques in which the complex phase and magnitude of the received optical signal can be recovered using an optical heterodyning process. Conventional DH methods require that the object be actively illuminated with a coherent optical source, but they offer many advantages including high sensitivity for remote sensing applications. Detection involves measuring the modulation of a strong reference field by a potentially weak signal field. This modulation allows for the detection of signals with energies equivalent to a single photon or less.

Figure 4:
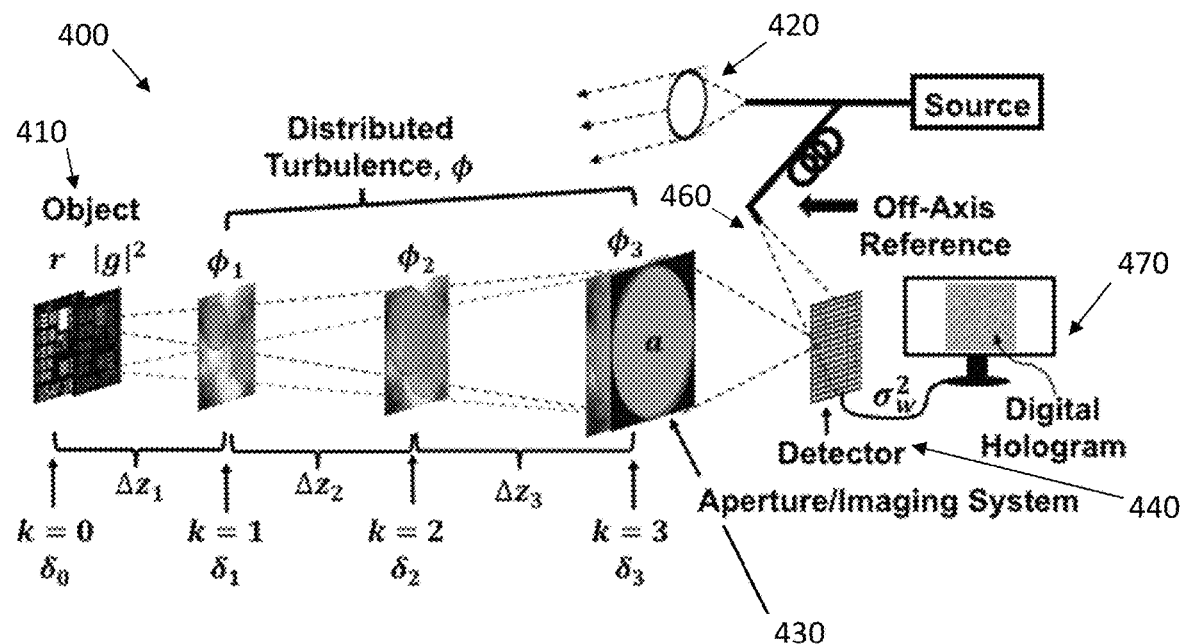
FIG. 4 shows an example of a model of anisoplanatic phase distortion caused by deep turbulence; the received complex DH signal is distorted by a series of phase modulation planes distributed in space.

In order to form a sharp image from a DH system, it is necessary to estimate and correct for the phase error imparted by the atmospheric perturbations. In the isoplanatic case, these can be represented by a single plane of phase errors in front of the DH sensor; but for the anisoplanatic case, as shown in FIG. 4, the phase errors must be represented by a set of planes at varying distance from the imaging sensor. For imaging applications, it is necessary to estimate and remove these phase errors to form a focused image. Similarly, for wave-front sensing applications, estimation of the phase errors represents the desired sensor output. In either case, accurately estimating the phase errors is a necessary and critical task.

FIG. 4 shows an exemplary embodiment of a digital holography optical imaging system 400 capable of implementing the ATPP predictor and methodology described herein. The system 400 includes a light source 420 (e.g., a laser) configured to emit (i.e., project) light away from the system and onto a target 410 (i.e., an object at a distance from the system 400). When the target 410 is illuminated with coherent light from the laser, light from the laser is reflected back toward the system 400, The reflected light is imaged through an aperture/imaging system 430 and onto a focal plane array (FPA) 440 as an incoming light field. The system also includes an interfering light source 460 configured to project an interfering light field to the FPA. In the disclosed embodiment, the light from the interfering light source 460 is also generated from the same device as the light source 420 (e.g., the same laser). The light source 420 projects light away from the FPA, and the interfering light source 460 projects light on to the FPA (e.g., at an angle of 45°). The FPA receives the incoming light field and the interfering light field and generates a signal that is delivered to one or more processors (e.g., microprocessors). The one or more processors are stored in a computer system 470 and are configured to process the signal that is based on the incoming, light field and the interfering light field and form an image of the object 410 on a display of the computer 470. However, turbulence along the imaging path creates phase errors in the incoming light that causes the image formed on the FPA 440 to be blurry. Accordingly, the one or more processors stored in the computer 470 of the ATPP system 400 are configured to generate a sequence of phase errors based on the image, as described above in association. with FIGS. 2 and 3, Furthermore, as also described above in association with FIGS. 2 and 3, the processors in the ATPP system 400 are configured to generate at least one training parameter based on the sequence of phase errors, and train a neural network to provide at least one revised training parameter using the sequence of phase errors, a time delay, and the at least one training parameter. Thereafter, the processors are configured to predict a future phase error for a future image based on the revised training parameter, State-of-the-art techniques for estimating phase errors from DH data involve maximizing an image sharpness metric with respect to the phase errors. Typically, multiple data realizations are obtained for which the image-to-image speckle variation is de-correlated but the phase errors are identical. For applications using pupil-plane detection, the data realizations are corrected using an initial estimate of the phase errors and then inverted using a Fast Fourier Transform (FFT). The inversion produces estimates of the complex-valued reflection coefficient, g, which are incoherently averaged to reduce speckle variations. The final phase-error estimate is then determined using an image sharpening (IS) algorithm to search for the phase errors that maximize a sharpness measure of the speckle-averaged image.

While image sharpening (IS) algorithms are designed to use multiple data realizations, others (e.g., Thurman and Fienup) have demonstrated that in favorable conditions, the algorithms can still be used when only one realization is available. For a high signal-to-noise ratio (SNR), with several hundred detected photons per detector element, their algorithm was able to estimate atmospheric phase functions with residual root-mean-square (RMS) errors as low as ⅛ of a wavelength. Nonetheless, estimating phase errors from a single shot of data remains a challenge for IS algorithms.

More recently, new methods known as model-based iterative reconstruction (MBIR) have been proposed for estimating atmospheric phase errors from. DH data in both the case of isoplanatic and anisoplanatic distortion. These methods, which are broadly referred to as DH-MBIR, are based on the mathematical insights first derived for the problem of synthetic aperture LIDAR (SAL). The MBIR approaches to DH and LIDAR use a Bayesian estimation framework based on MAP estimation and an image prior model.

A key advantage of DH-MBIR over methods such as IS is that it can dramatically reduce the number of unknown parameters required to reconstruct the image. This parameter reduction allows for the estimation of many more nuisance parameters, such as the atmospheric phase errors, from the available DH data. In addition, it allows DH-MBIR to work much more effectively on single-shot DH data.

In order to better understand why MBIR can reduce the number of unknowns in a DH imaging problem, consider FIGS. 5A-5D, FIG. 5D shows a scenario in which an object (e.g., satellite 510) is illuminated with a laser and the reflected light is captured with a DH imaging system 500, including a light source 520, a focal plane array (not shown), and a DH imaging computer 570 including one or more microprocessors. As noted in FIG. 5A, the variable $r_s$ denotes the real-valued reflectance as a function of the pixel position index s. Notice that $r_s$ is generally a smooth quantity spatially since it represents the average fraction of the illuminant that is reflected back. Intuitively, $r_s$ is the real-valued quantity that would be advantageous to image without any speckle.

Alternatively, the reflection coefficient can be defined by a complex number that represents the amplitude and phase of the reflected light. Typically, the size of a pixel will be much greater than the wavelength, $\lambda$, of the illumination. So therefore, the number of scatters in a single pixel will be large, and by the central limit theorem $g_s$ can be accurately modeled as a conditionally complex Gaussian random variable with mean 0, and expected squared magnitude given by $$E[|g_s|^2|r_s]=r_s. \quad (10)$$

Figure 5A:
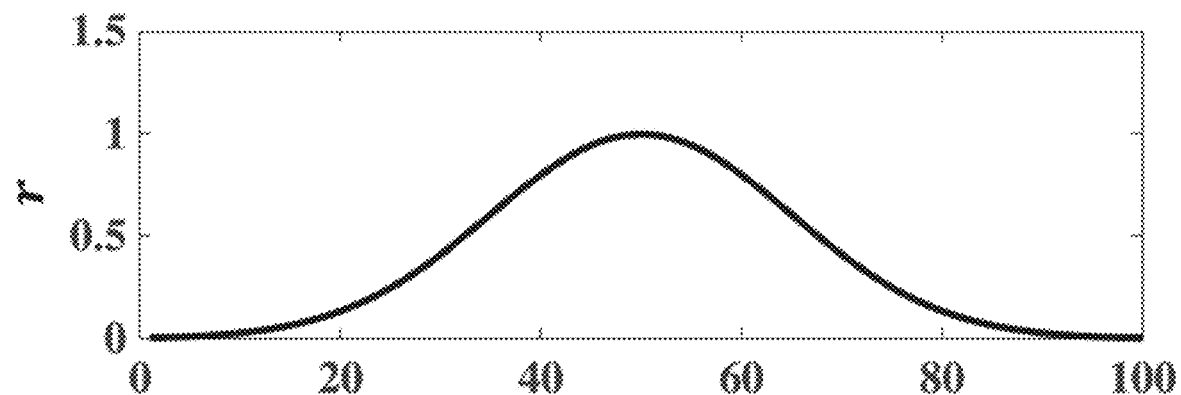
FIG. 5A shows the real-valued reflectance, $r_s$, captured by the DH imaging system of FIG. 5D.
Figure 5B:
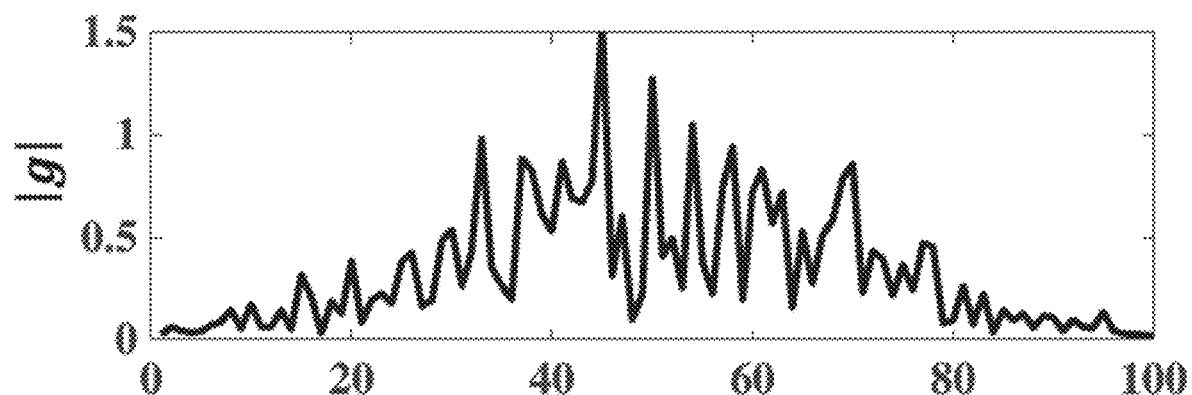
FIG. 5B shows the magnitude, $|g_s|$, of the reflectance captured by the DH imaging system of FIG. 5D.
Figure 5C:
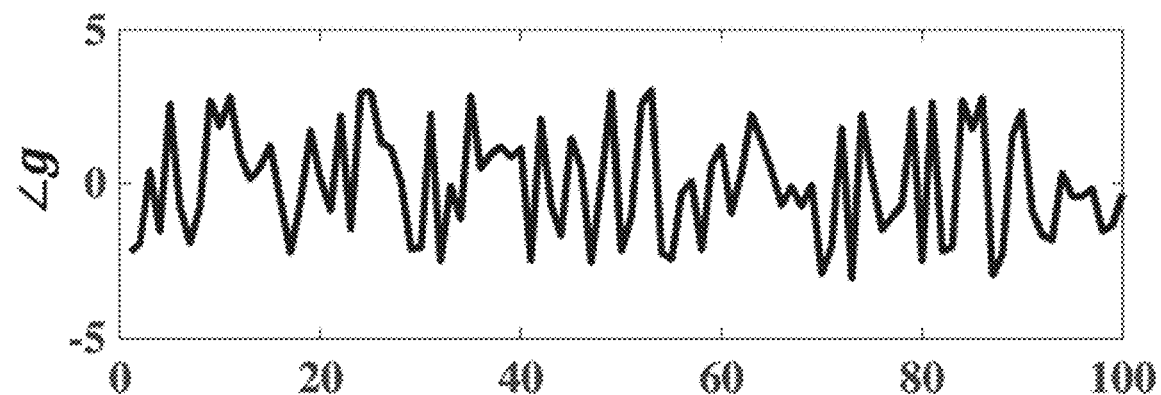
FIG. 5C shows the phase, $\angle g$, captured by the DH imaging system of FIG. 5D.
Figure 5D:
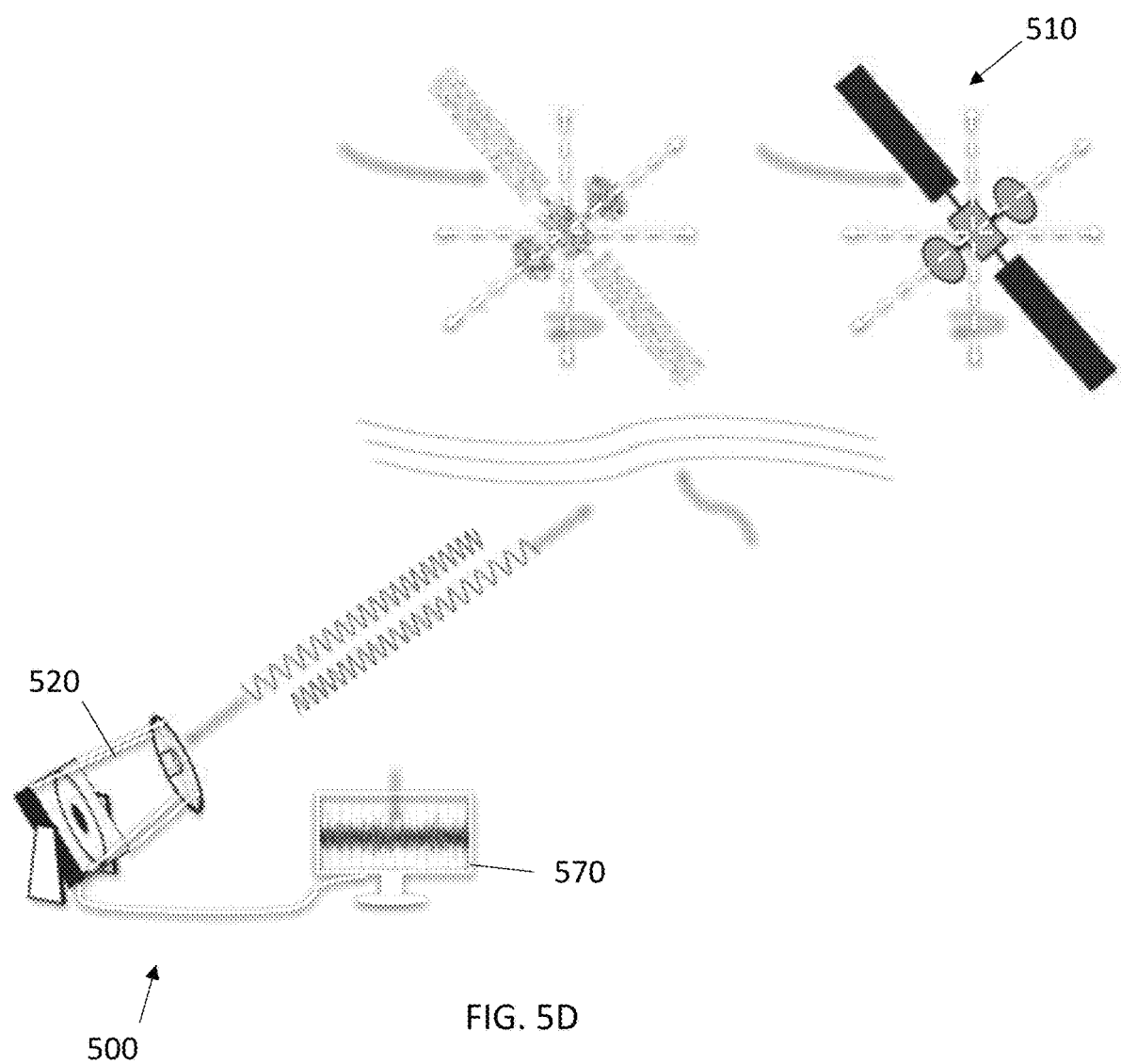
FIG. 5D shows an arrangement of a DH imaging system wherein an object is illuminated with a laser and the reflected light is captured with a DH imaging system.

FIGS. 5A-C provide an illustration of the above. While the reflectance, $r_s$, is generally a smooth quantity, the reflection coefficients, $g_s$, are conditionally independent and identically distributed (i.i.d.) complex Gaussian random variables given the reflectance $r_s$. This implies that the magnitude of the reflection coefficient, $|g_s|$, shown in FIG. 5B has only a small amount of spatial correlation, and its phase, shown in FIG. 5C, is spatially uncorrelated.

Traditional DH algorithms attempt to reconstruct the complex reflectance coefficient, $g_s$, and then take its magnitude. However, since $g_s$ has much more variation than $r_s$ and is complex rather than real, it follows that $g_s$ has many more degrees of freedom than $r_s$. Consequently, $r_s$ can be reconstructed with much less data than is typically required to accurately reconstruct $g_s$.

The power of the DH-MBIR algorithm is that it reconstructs the low-dimensional reflectance, $r_s$, rather than the high-dimensional reflection coefficient, $g_s$ This means that DH-MBIR algorithm can accurately reconstruct images from less data, and in particular from a single shot of data. This is important because one critical goal will be to generate phase correction estimates that are accurate at the current time, with little or no latency. If $N_f$ frames of data are required to estimate the phase, then the resulting phase estimates will be delayed by approximately $$\frac{N_f}{2}.$$

This latency delay results in errors in the phase estimates that will reduce overall system performance in real-time applications such as in wave-front phase correction required when focusing an emitted optical beam.

In a typical scenario, the number of complex data points measured by the DH system is N, and the number of reconstructed pixel locations is also N. However, since $r_s$ is smooth and real, the ratio of the number of real measurements to the number of real unknowns is given by $$\frac{\text{\# Real Measurements}}{\text{\# Real Unknowns}} = \frac{2N}{aN} \quad (11)$$

where $\alpha<1$ is determined by the smoothness of $r_s$. For typical 2D imaging scenarios the images may be low dimensional with $$\frac{1}{16} < \alpha < \frac{1}{2}.$$

This means that the problem of reconstructing $r_s$ is overdetermined by a factor of $2/\alpha$, making reconstruction much easier. Perhaps more importantly, when $$\frac{2}{\alpha} \gg 1,$$

then these redundant measurements can be used to estimate additional unknown parameters, such as the atmospheric phase errors.

In order to compute the MBIR reconstruction, one must solve the optimization problem given by $$(\hat{r}, \hat{\phi}) = \underset{r,\phi}{\operatorname{argmax}} \{\log p(y \mid r, \phi) + \log p(r) + \log p(\phi)\} \quad (12)$$

where y is the complex DH data recovered from the coherent imaging system and $\phi$ denotes the unknown atmospheric phase parameters. Unfortunately, direct numerical optimization of this expression is extremely computationally intensive due to the intractable nature of the so-called data term p(y|r). In particular, this conditional distribution of the DH data given the reflectance has the form $$p(y \mid r) = \int_{\mathbb{R}^N} \left(\frac{1}{(\pi\sigma^2)^M} \exp\left(-\frac{1}{\sigma^2}\|y - A_\phi g\|^2\right)\right) \quad (13)$$
$$\left(\frac{1}{\pi^M |D(r)|} \exp(-g^H [D(r)]^{-1} g)\right) dg$$

where D(r) denotes the diagonal matrix formed from the vector r, and $$A_\phi = D(a)D(\exp\{j\phi\})F \quad (14)$$

is the complex propagation model for the isoplanatic case. The major computational challenge is due to the N dimensional integral with respect to g. In the anisoplanatic case, the matrix, $A_\phi$, becomes more complex, but otherwise, the form of this conditional probability is similar.

The key insight that allows the tractable computation of the DH-MBIR was introduced in references cited in association with this disclosure. In particular, the expectation-maximization (EM) algorithm can be used to create a simplified surrogate function for the intractable expression of p(y|r) in (1). It is shown that the Q function of the EM algorithm has a closed form for this problem, so that the DH-MBIR optimization can be performed by a series of relatively simple optimizations. Each iteration of the EM algorithm requires evaluation and maximization of an expression given by $$y^H A_{99} C A_{\phi'}^H$$

where C is a simple diagonal matrix, and $\phi$ and $\phi'$ are the estimated phase errors before and after each iteration. Notice that each transformation, A, requires the application of an N×N FFT, where a practical value is N=128. So, each iteration of the EM algorithm requires at a minimum two 128×128 complex FFTs.

A number of technical extensions to the DH-MBIR algorithm are of great potential importance but also increase the complexity and computational requirements of the algorithm. In particular, a method is introduced for advanced prior modeling which may be referred to as Plug & Play (P&P) priors. This method allows for the introduction of priors based on advanced non-parametric de-noising methods such as BM3D and convolutional neural networks (CNN)/machine learning, By using such models, it is possible to capture subtle aspects of phase correlation that can further reduce the number of degrees of freedom. In fact, the value of using the advance prior models in a P&P framework has been demonstrated, for the phase recovery in both LIDAR imaging and single shot DH imaging applications.

Figure 6:
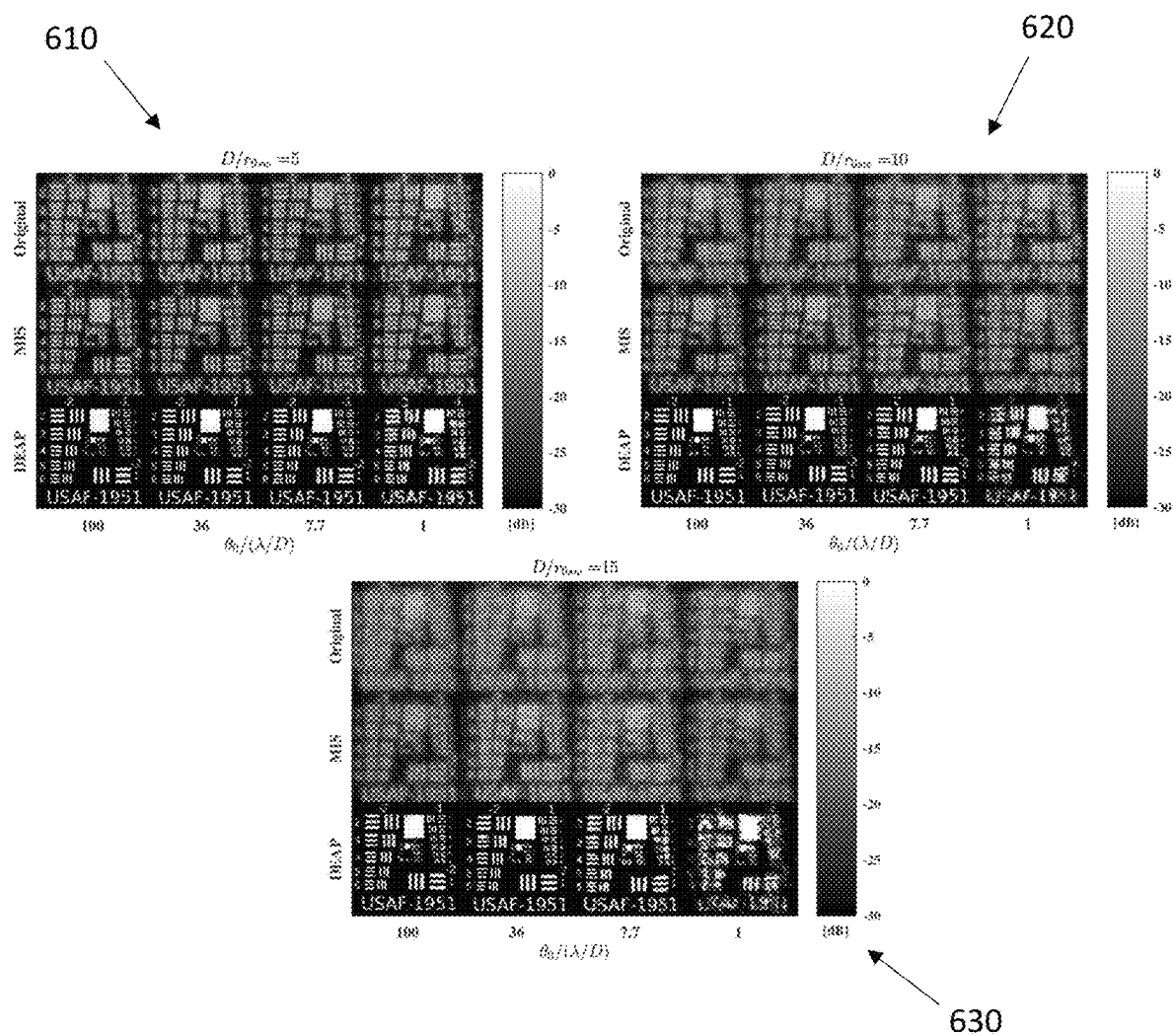
FIG. 6 shows three screen-shot results of multi-planar image sharpening (MIS) and DH-MBIR (DEAP) reconstructions using an anisoplanatic simulation of single-shot data as a function atmospheric turbulence ($D/r_0$) and anisoplanarity ($\theta_0/(\lambda/D)$).

With reference now to FIG. 6, three screens 610, 620, 630 are shown illustrating experimental results that support the potential of DH-MBIR. First, consider the issues of atmospheric turbulence and anisoplanarity for the single-shot case. Each screen 610, 620, 630 of FIG. 6 shows a comparison of a multiplane IS algorithm (MIS) (row two of each screen) and the Deep-turbulence Estimator for Anisoplanatic Propagation (DEAP) algorithm (row three of each screen) using single-shot simulated data and an off-axis image-plane recording geometry (IPRG). The DEAP algorithm is the DH-MBIR algorithm modified to accommodate a deep turbulence model. Each of the three screens of FIG. 6 corresponds to a different assumed level of atmospheric turbulence, and each column corresponds to a different assumed level of anisoplanarity.

Notice that in all cases/screens of FIG. 6, the DEAP algorithm processes high quality image reconstructions. Generally, the relative improvement of DEAP over MIS is greatest when the atmospheric turbulence is high and the anisoplanarity is greatest. Moreover. DEAP produces images of potentially usable quality for cases in which MIS is severely degraded. It will be particularly recognized that DEAP has much better image quality particularly when the atmospheric turbulence is greatest for $$\frac{D}{r_0} = 15$$

and the anisonplanarity is high for $\theta_0/(\lambda/D)=1$.

With reference now to FIG. 7, an illustration of the basic flow of the DH-MBIR algorithm is shown in pseudocode. First note that the algorithm is iterative, and should be run to convergence. However, computation and latency can be minimized by a) selecting a good initial condition and b) using an update strategy that limits the number of required iterations to a very small number. Importantly, there are three major steps to the algorithm: a) The F-step which requires the computation of two 128×128 point FFTs; b) the update of the phase parameters; and c) the update of the reflectance parameters.

Figure 8A:
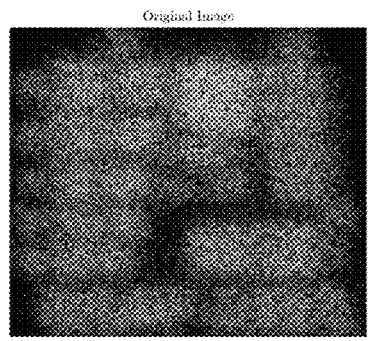
FIG. 8A shows partial results of the DH-MBIR of FIG. 7 on simulated data, and particularly the magnitude-squared of simulated complex reflectance data.
Figure 8B:
FIG. 8B shows partial results of the DH-MBIR of FIG. 7 on simulated data, and particularly the result of applying the phase correction to the results of FIG. 8A.
Figure 8C:
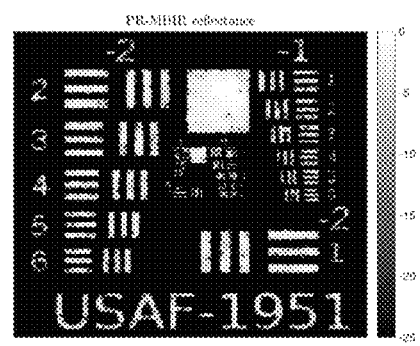
FIG. 8C shows the results of the DH-MIR of FIG. 7 on simulated data, and particularly the full DH-MBIR result for restoring y.

The DH-MBIR algorithm of FIG. 7 was implemented in the Matlab programming environment. Results on simulated data are shown in FIGS. 8A-8C. FIG. 8A shows the blurring that occurs due to the simulated atmospheric phase distortions. After running the DH-MBIR restoration, the phases of the complex image in 8A are corrected in the Fourier domain using the estimated phases ϕ, and the magnitude squared of this result. FIG. 8A shows the magnitude-squared of the simulated complex reflectance data. FIG. 8B shows the result of applying the phase correction to FIG. 8A, which was obtained by DH-MBIR. FIG. 8C shows the full DH-MBIR result for restoring y, including the estimated reflectance, r.

Concept of Operation

In ISR applications, the goal is to generate a real-time stream of video data at sufficient frame rates to be informative and without so much latency that the information is "stale". A second more demanding application is wave-front sensing in which the goal is to estimate the incoming wave-front distortion so that it can be used for a variety of possible applications. In this case, it is the phase distortions rather than the reconstructed image that is of greatest importance. One application of wave-front sensing is to estimate the phase correction for outgoing optical beams.

Figure 9:
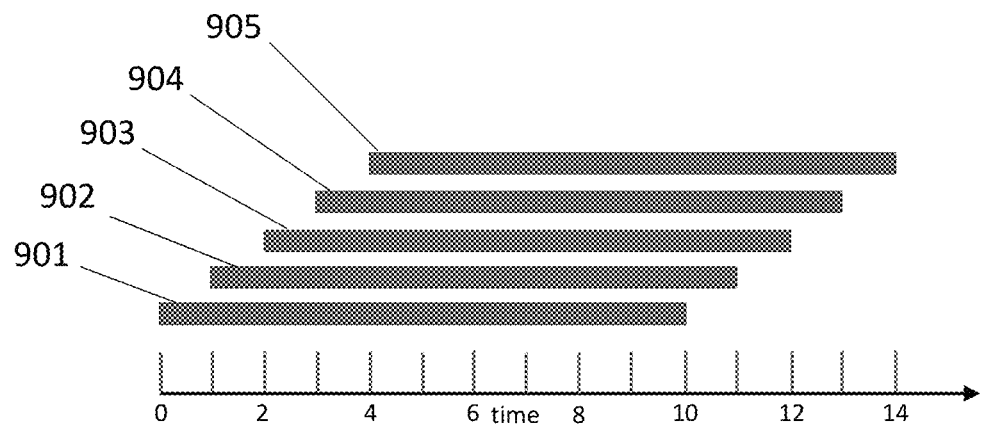
FIG. 9 is a graph illustrating the concept of latency vs. throughput; each horizontal bar represents a task, each tick on the X axis indicates one second.

In order to quantify the performance requirements for these two applications, the two important concepts of latency and throughput as illustrated in FIG. 9 are used. In this example, five units of work 901, 902, 903, 904, and 905 are illustrated as horizontal bars on the graph. Each item of work takes ten (10) units of time, here assumed to be one (1) second. For each second, a new item of work arrives. Each item of work takes 10 sec to complete, so the latency of an item of work in this system is 10 sec. Assuming work is arriving at the rate of 1 piece of work per second, a new work item can be initiated in parallel every second. Thus, the throughput of the system is 1 item/sec, even though the latency is 10 sec.

This observation leads to two important implications. First, as long as work items are independent and arriving sufficiently fast, throughput can be increased by increasing the amount of hardware, allowing more work items to be processed at a time. In particular, given independent work items arriving fast enough, increasing throughput is simply a matter of using more hardware. In fact, this is the case for the current problem because a group of time frames can always be computed in parallel. Second, latency is a more difficult problem then throughput: it can only be decreased by decreasing the amount of time spent on each work item. This can be done in two ways, by increasing the parallelism within each work item and/or by decreasing the number of operations along the critical path of a parallel solution to the work item. Unlike increasing throughput, these require fundamental modifications to the algorithm in addition to sufficient hardware.

With this context in mind, the problem of DH-MBIR latency and throughput for the specific applications of ISR and wave-front sensing is now analyzed. While specific applications of ISR may vary widely, a typical application might require a frame rate of 60 frames per second with a corresponding nominal latency of 1/60 sec=16.7 msec. However, wave-front sensing is a more demanding application primarily due to the dramatically lower latency requirements resulting from the fact that the estimated phase corrections must be used to correct the outgoing wave-front in real time.

The latency and throughput requirements for a wave-front sensing system depend on some system design assumptions. Current DH technology supports a camera frame rate of 10 kHz, so this defines the desired throughput of such a system. The latency of a system with this sampling rate is nominally 100 μsec since this corresponds to the sampling period. For a wave-front specified by a 100×100 size array, with a Greenwood frequency of $f_g$=100 Hz, and using the frozen flow hypothesis, then the phase errors will shift by approximately 1 pixel in a time corresponding to $$\tau_p = \frac{\tau_g}{100} = \frac{1}{(100 f_g)} = 100 \ \mu sec,$$

which is also consistent with the sampling period latency. Moreover, this means that every 100 μsec of latency corresponds to a 1 pixel shift of the phase corrections at a Greenwood frequency of 100 Hz. Another view of latency comes from the loop bandwidth requirements for a closed loop AO system. From this perspective, the "rule-of-thumb" is that the loop bandwidth should be at least 10× the Greenwood frequency. So a Greenwood frequency of 100 Hz requires a loop bandwidth of 1 kHz, which corresponds to a latency of approximately 1 msec.

Table 1, below, summarizes the latency and throughput requirements for the system design. Note that the wave-front sensing application requires a throughput of 10 kHz with a latency between 100 to 1000 μsec depending on the details of the application.

TABLE 1

Assumed bandwidth and latency requirements for imaging and wave-front sensing applications.
All cases assume single-shot DH sensing.

| Application | Latency | Throughput (frames/sec) |
|---|---|---|
| ISR | <16.7 msec | 60 Hz |
| Wave-front sensing | <100 μsec to 1 msec | 10 kHz |

Acceleration of Convergence Rate

The number of iterations per DH-MBIR algorithm run is a critical parameter in achieving the desired throughput and latency values specified in Table 1. In fact, from FIG. 11, it would appear that hundreds of iterations are required for convergence. However, the number of iterations required can be dramatically reduced by improving the initial conditions for the algorithm. In this section, results are presented showing that by using the solution at the previous time sample as an initial condition for the current time, iteration count can be dramatically reduced. With ATPP, the number of iterations for convergence can be further reduced by providing a more accurate initial condition for both the phase error estimates and the image estimate.

Figure 10:
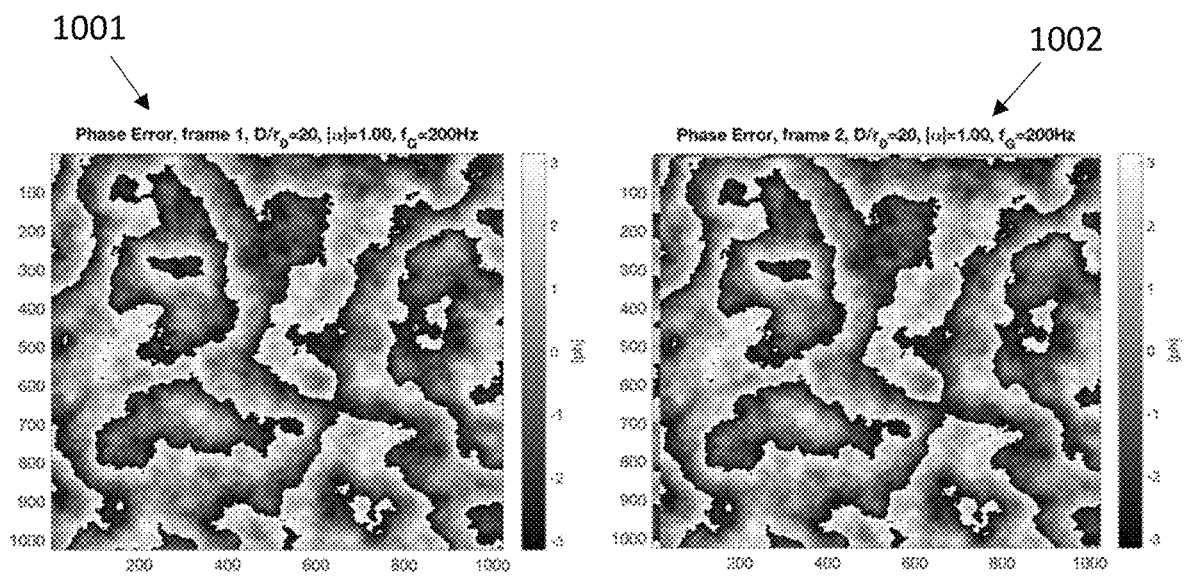
FIG. 10 shows two successive phase screens from an AR simulation assuming Taylor's frozen flow at a sampling rate of $f_s=10$ kHz.
Figure 11:
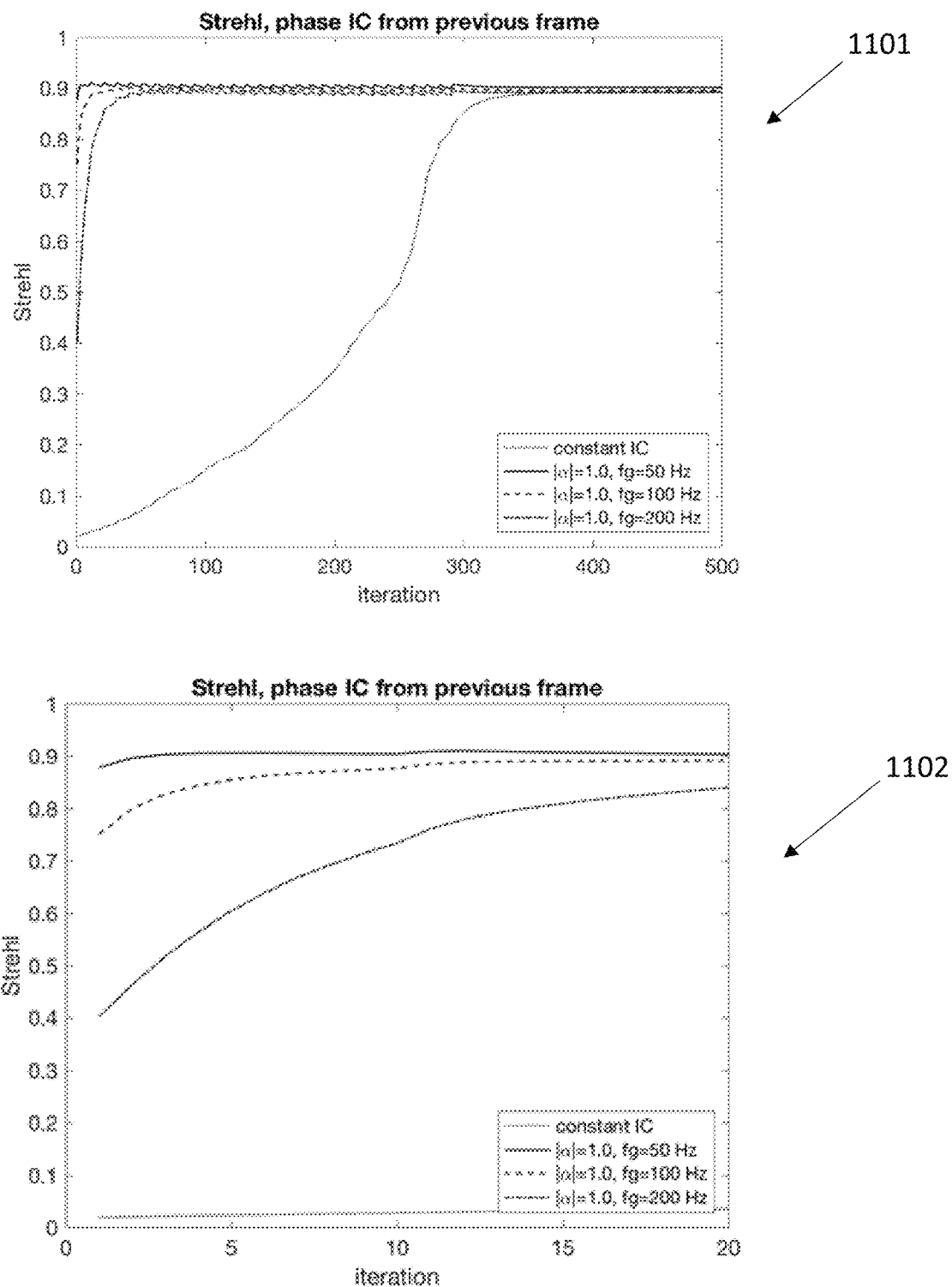
FIG. 11 shows two screens illustrating convergence of the Strehl ratio in the AR simulation after initializing the phase image with the estimate from the previous frame; the left and right images show different ranges on the x-axis; all results use a sampling rate of $f_s=10$ kHz.

FIGS. 10 and 11 show simulations of a DH-MBIR system. For the isoplanatic case, the parameters affecting the phase screen evolution are the frame sampling rate $f_s$; Fried's parameter, $r_0$, or equivalently, the atmospheric turbulence parameter $D/r_0$ governing the degree of phase screen autocorrelation; the Greenwood frequency, $f_g$, that controls the amount of between-frame translation due to mean flow; and the magnitude of an AR parameter, $\alpha$, which affects the degree of simulated atmospheric turbulence, or "boiling". FIG. 10 shows two successive frames 1001, 1002 of the phase distortion image with parameters $f_s$=10 kHz, $$\frac{D}{r_c} = 20, |\alpha| = 1,$$

and $f_g$=200 Hz. As a simple approximation, the translation due to mean flow wraps around the domain which can be seen in the right image on the top and left borders. A Greenwood frequency of 200 Hz here corresponds to a translation of approximately 2% across the pupil of the imaging system.

FIG. 11 shows two graphs 1101 and 1102 showing the Strehl ratio as a function of iteration number in a simulation using a variety of parameters. In each case, the initial condition for the phase image was taken to be the result of the prior frame computed to convergence with a sampling rate of $f_s$=10 kHz. Clearly, this better initial condition can dramatically reduce the number of required iterations. Notice that at a Greenwood frequency of 100 Hz, the Strehl ratio is over 80% of its optimum value after only 1 iteration.

Overview of Exemplary Digital Holography Optical Imaging System

Figure 12A:
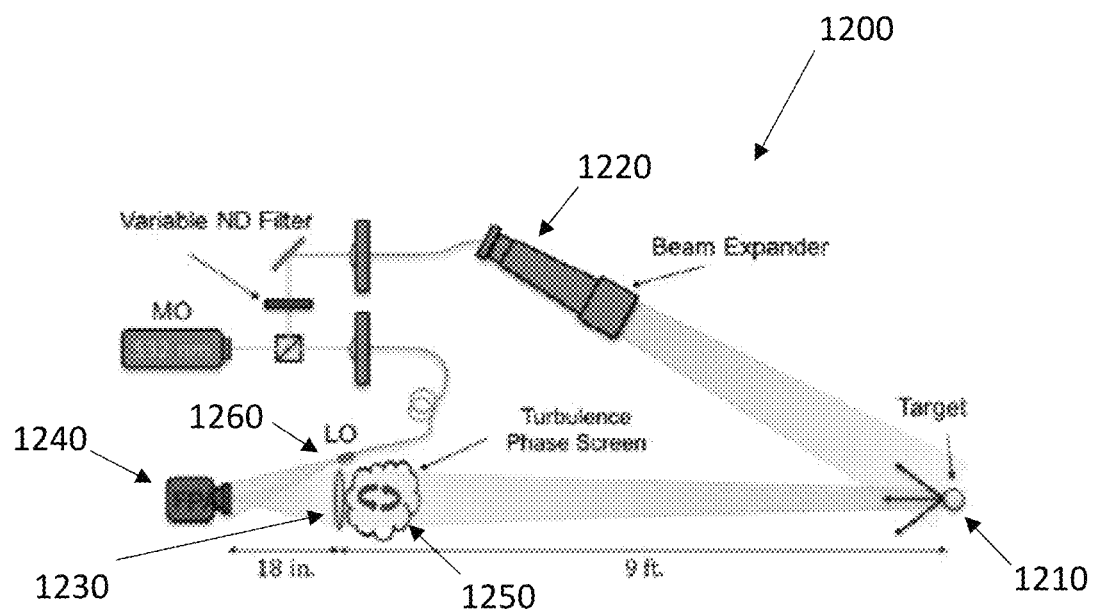
FIG. 12A shows a digital holography (DH) system architecture along with its processed outputs; the figure illustrates how the coherent light source (i.e., laser) is used to illuminate an object and the same light source is interfered with in incoming light to form a heterodyned image, h.
Figure 12B:
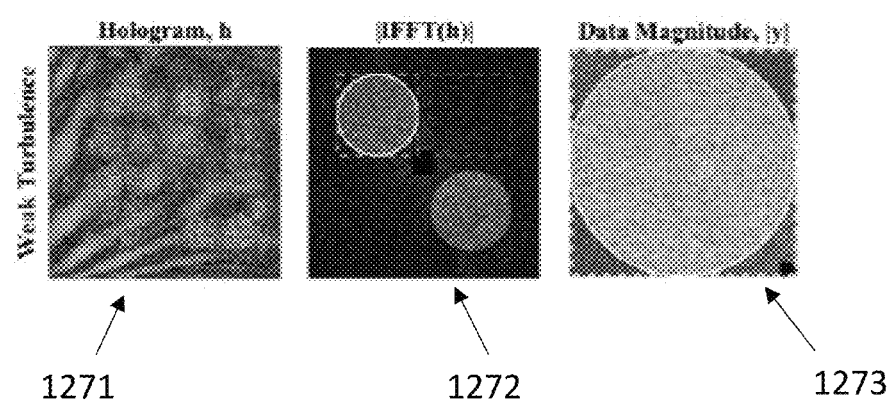
FIG. 12B shows example steps in the preprocessing of the data from the system of FIG. 12A.

The notation construct below will be recognized by those of skill in the art in association with the following overview of a digital holography optical imaging system.

y—image of complex holographic measurements
g—image of complex reflection coefficients
∅—image of measurement phase distortions
$A_\varnothing$—linear forward model parameterized by the phase distortions
r—image of unknown real-valued reflectances
h—real valued holographic image obtained from the focal plane array (FPA)
H—FFT of h FIG. 12A illustrates the structure of an exemplary DH system 1200 that may be used to implement the ATPP predictor and methodology disclosed herein, and FIG. 12B illustrates exemplary outputs. From FIG. 12A it will be noted that the target 1210 (i.e., an object at a distance from the system 1200) is illuminated with coherent light from a laser 1220 or other light source. The reflected light (i.e., from the laser that is reflected off of the target 1210) is imaged through a lens 1230 onto a focal plane array (FPA) 1240. However, turbulence 1250 along the imaging path creates phase distortions in the incoming light that causes the image formed on the FPA to be blurry.

In a DH system, the incoming light field is interfered with the same coherent light used to illuminate the target. This interfering light source 1260 (known as the LO) is projected onto the FPA at a slight angle, θ. Typically, this is done at a 45° angle to the HA, so the electric field from the LO on the surface of the FPA can be represented as $$LO(m, n) = L_o \epsilon^{j\omega_0 \frac{(m+n)}{\sqrt{2}}} \quad (15)$$

where $$\omega_0 = \frac{\tau \sin\theta}{\lambda},$$

λ is the wavelength of the light, and T is the spacing of pixels on the EPA.

The electric field of the incoming light from the target, y(m, n), is then added to the LO signal. Since the FPA detects the energy in the incoming light, its response is proportional to the square of the total electric field, so the output image has the form $$h'(m, n) = \left| y(m, n) + L_o \epsilon^{j\omega_0 \frac{(m+n)}{\sqrt{2}}} \right|^2 \quad (16)$$

$$= 2\text{Re}\left\{ y(m, n) L_o \epsilon^{j\omega_0 \frac{(m+n)}{\sqrt{2}}} \right\} + |y(m, n)|^2 + |L_o|^2$$

The signal $|y(m, n)|^2$ is typically very small so it will be ignored (it also occurs at low spatial frequencies, so it can be filtered out in later processing), and the term $|L_o|^2$ is a constant offset. The primary source of noise is typically Poisson noise due to photon counting, so the variance of this noise is proportional to $|L_o|^2$ and its variance is proportional to $|L_o|$. Therefore, if normalized by $|L_o|$, then the output signal is formed given by $$h(m, n) = 2\text{Re}\left\{ y(m, n) e^{j\left(\omega_0 \frac{(m+n)}{\sqrt{2}} + \alpha\right)} \right\} + w(m, n) + C \quad (17)$$

where α an unknown phase offset, C is a constant offset, and ω is zero-mean white Gaussian noise with variance of $\sigma_n^2$. Notice that $\sigma_n^2$ is invariant to the magnitude of $|L_o|$.

Figure 13A:
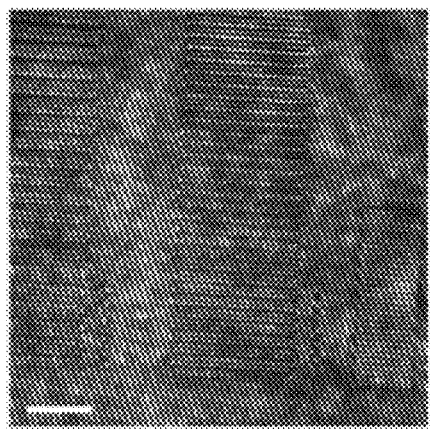
FIG. 13A shows the real output, h, of a DH system, and particularly a region of the output image.
Figure 13B:
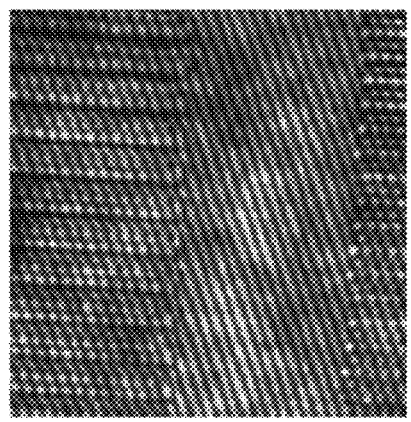
FIG. 13B shows a zoomed-in portion of the image of FIG. 13A.

The images in FIGS. 13A and 13B provide some intuition by showing typical outputs of a DH system. Notice the diagonal lines in the zoomed-in portion of the image shown in FIG. 13B. These diagonal lines are due to the interference between in incoming light field, and the LO light source. Because the LO source comes in at an angle, there is a Moire effect as the two coherent light fields interfere on the surface of the FPA. Intuitively, as the electric fields of the two light sources conic in and out of phase, they constructively and destructively interfere, causing the amplitude of the detected signal to oscillate. Importantly, the amplitude and phase of this oscillating sine wave encodes the magnitude and phase of the complex light field y(m, n). This is known in signal processing as heterodyning, and it is commonly used in a wide array of applications (e.g., in AM or FM radio) to recover the complex signal y.

FIG. 12B illustrates the preprocessing chain required to recover y(m, n) from the signal h(m, n) in the DH preprocessing chain. FIG. 12B specifically shows exemplary display screens showing (i) Hologram, h (illustrated in screen 1271) (ii) |IFFT(h)| (illustrated in screen 1272), and (iii) Data Magnitude, |y|, (illustrated in screen 1273), of the preprocessing chain. The first image, h(m, n), in FIG. 12B is the direct output of the FPA. Notice that it contains a blurry version of the desired target image due to the lens used in the imaging system (it is also possible to implement the DH system without a lens; in this case, h would contain the Fourier transform of the blurry image). However, the contrast is poor due to the background signal C, and if you zoom into this image, you would see the same diagonal sine wave pattern of FIG. 13B.

In order to recover y, take the discrete Fourier transform (DFT) of h denoted by H=FFT(h). For this application, assume that h(m, n) is a 256×256 image, so the DFT can be implemented with a radix-2 fast Fourier transform (ITT). Since H(k, l) is complex, FIG. 12B shows the magnitude of H. Notice that H contains two sub-images, one in the upper left, and a second in the lower right. Mathematically, the holographic image y can be represented as $$h(m, n) = 2\mathrm{Re}\{y(m, n)e^{j\omega_0(m+n)}\} + C$$
$$= y(m, n)e^{j\omega_0(m+n)} + y^*(m, n)e^{-j\omega_0(m+n)} + C.$$

So the two images correspond to these two versions of the signal modulated with positive and negative frequencies. Also note that the circular support of these sub-images is due to the fact that the lens has a circular aperture.

In order to recovery y, as shown in FIG. 12C, one must select one of these two images and recenter it in the middle of a 128×128 image. This selection and recentering can be done by windowing out a 128×128 region of the image H to form a new smaller but complex image y. If there were no phase distortion, then y would be the Fourier transform of the desired (complex) image. It will therefore be in input to the present PR-MBIR system.

To summarize, the PR-MBIR preprocessing steps are as follows:

Step 1: Obtain the 256×256 DH image, h(m, n).
Step 2: Take the 256×256 FFT of h to form H(k, l).
Step 3: Window out a 128×128 region of H to form y. (18)

Although exemplary embodiments of a system and method for latency reduction in an optical imaging system have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other systems, features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the claims that follow herein.

What is claimed is:

1. A computer-implemented method of latency reduction in a digital holography optical imaging system, the method comprising:
   receiving an incoming light field at a focal plane array of the digital holography optical imaging system;
   applying an interfering light field to the incoming light field at the focal plane array;
   generating a holographic image based on the incoming light field and the interfering light field at the focal plane array;
   generating a sequence of phase errors based on the holographic image;
   generating at least one training parameter based on the sequence of phase errors;
   training a neural network to revise the at least one training parameter using the sequence of phase errors, a time delay, and the at least one training parameter; and
   predicting a future phase error for a future holographic image based on the revised training parameter.

2. The method of claim 1, wherein the neural network includes a linear predictive filter configured to predict the future phase error.

3. The method of claim 1 wherein the at least one training parameter is learned by minimizing a loss function provided by a loss function module.

4. The method of claim 3 wherein training the neural network comprises generating a sequence of previous phase errors incorporating the time delay, inputting the previous phase errors into a training predictor, inputting an output of the training predictor and the previous phase errors into a loss function module, and generating the revised training parameter as an output of the loss function module.

5. The method of claim 1 further comprising detecting a total energy of the incoming light field, wherein generating the holographic image is based at least in part on the total energy of the incoming light field.

6. The method of claim 1 wherein generating a holographic image based on the incoming light field and the interfering light field at the focal plane array includes heterodyning and results in an image of complex holographic measurements.

7. The method of claim 1 wherein the interfering light field applied to the incoming light field at the focal plane array is generated from the same light source as the incoming light field and is projected on to the focal plane array at an angle.

8. A computer-implemented method of latency reduction in a digital holography optical imaging system, the method comprising:
   receiving an incoming light field;

generating a reconstructed image and estimated phase error based on the received incoming light field, wherein the reconstructed image and estimated phase error are generated by a digital holographic model-based iterative reconstruction (DH-MBIR) method defined by an initial condition, and wherein the reconstructed image and estimated phase error are defined by a computation latency of the DH-MBIR method;

applying the reconstructed image and estimated phase error generated by the DH-MBIR method to a first adaptive predictor;

generating, with the first adaptive predictor, a revised initial condition for the DH-MBIR method;

applying the reconstructed image and estimated phase error generated by the DH-MBIR method to a second adaptive predictor; and generating, with the second adaptive predictor, a predicted future image and predicted future phase error associated with a future time.

9. The method of claim 8 wherein the future time is greater than or equal to the computation latency.

10. The method of claim 8 further comprising emitting a light source based on the predicted future image and the predicted future phase error.

11. An optical imaging system comprising:
a laser configured to emit light;
a focal plane array configured to receive an incoming light field including reflected light from the laser;
an interfering light source configured to apply an interfering light field to the focal plane array; and
at least one processor configured to:
generate an image based on the incoming light field and the interfering light field at the focal plane array;
generate a sequence of phase errors based on the image;
generate at least one training parameter based on the sequence of phase errors;
train a neural network to provide at least one revised training parameter using the sequence of phase errors, a time delay, and the at least one training parameter; and
predict a fixture phase error for a future image based on the revised training parameter.

12. The optical imaging system of claim 11, wherein the optical imaging system is a digital holography imaging system, wherein the image is a holographic image, and wherein the future image is a future holographic image.

13. The optical imaging system of claim 12, wherein the neural network includes a linear predictive filter configured to predict the future phase error.

14. The optical imaging system of claim 12 wherein the at least one training parameter is learned by minimizing a loss function provided by a loss function module.

15. The optical imaging system of claim 12 wherein the at least one processor is configured to, when training the neural network, generate a sequence of previous phase errors incorporating the time delay, input the previous phase errors into a training predictor, input an output of the training predictor and the previous phase errors into a loss function module, and generate the revised training parameter as an output of the loss function module.

16. The optical imaging system of claim 12 wherein the at least one processor is further configured to detect a total energy of the incoming light field and generate the holographic image based at least in part on the total energy of the incoming light field.

17. The optical imaging system of claim 12 wherein the at least one processor is configured to perform heterodyning when generating the holographic image based on the incoming light field and the interfering light field at the focal plane array, wherein the heterodyning results in an image of complex holographic measurements.

18. The optical imaging system of claim 12 wherein the interfering light field is generated from the laser and is projected on to the focal plane array at an angle.

19. The optical imaging system of claim 18 wherein the angle is 45°.

20. Thee method of claim 11 wherein the laser is configured to emit light away from the focal plane array and the interfering light sources is configured to emit light toward the focal plane array.

* * * * *